(12) United States Patent
Chang

(10) Patent No.: US 11,059,068 B2
(45) Date of Patent: Jul. 13, 2021

(54) EDGE BANDING MACHINE WITH DETACHABLE ADHESIVE APPLYING MECHANISM

(71) Applicant: OAV EQUIPMENT AND TOOLS, INC., Taichung (TW)

(72) Inventor: Yen-Tsung Chang, Taichung (TW)

(73) Assignee: OAV EQUIPMENT AND TOOLS, INC.

( * ) Notice: Subject to any disclaimer, the term of this patent is extended or adjusted under 35 U.S.C. 154(b) by 0 days.

(21) Appl. No.: 16/726,685

(22) Filed: Dec. 24, 2019

(65) Prior Publication Data

US 2020/0384495 A1 Dec. 10, 2020

(30) Foreign Application Priority Data

Jun. 6, 2019 (TW) ................................ 108119765

(51) Int. Cl.
| | |
|---|---|
| *B29C 65/00* | (2006.01) |
| *B05C 1/08* | (2006.01) |
| *B05C 11/11* | (2006.01) |
| B29C 65/48 | (2006.01) |
| B32B 37/12 | (2006.01) |
| B29C 65/52 | (2006.01) |

(52) U.S. Cl.
CPC ................. *B05C 1/08* (2013.01); *B05C 11/11* (2013.01); *B29C 65/48* (2013.01); *B29C 65/524* (2013.01); *B29C 65/525* (2013.01); *B32B 37/12* (2013.01)

(58) Field of Classification Search
CPC ..... B29C 65/48; B29C 65/524; B29C 65/525; B32B 37/12
See application file for complete search history.

(56) References Cited

U.S. PATENT DOCUMENTS

| 5,246,533 | A | * | 9/1993 | Mochizuki | ............. | B27D 5/003 |
| | | | | | | 156/267 |
| 10,124,536 | B1 | * | 11/2018 | Jan | .......................... | B29C 66/80 |
| 2012/0240846 | A1 | * | 9/2012 | Lin | ...................... | B05C 11/041 |
| | | | | | | 118/244 |
| 2016/0193780 | A1 | * | 7/2016 | Noelting | ................. | B29C 65/48 |
| | | | | | | 156/353 |

FOREIGN PATENT DOCUMENTS

| TW | M409152 U1 | 8/2011 |
| TW | M559851 U | 5/2018 |

* cited by examiner

*Primary Examiner* — Mark A Osele
*Assistant Examiner* — Nickolas R Harm
(74) *Attorney, Agent, or Firm* — Muncy, Geissler, Olds & Lowe, P.C.

(57) ABSTRACT

An edge banding machine includes a foundation, an adhesive applying mechanism, a motor, a chain guide and a chain. The adhesive applying mechanism is detachably attached to foundation and includes an adhesive tank and an adhesive shaft that extends into the adhesive tank and has a lower end provided with a first sprocket. The adhesive shaft draws adhesive from the adhesive tank. The motor is fixed to the foundation and has a power-take-off shaft that has a second sprocket. The chain engages with the first sprocket and the second sprocket. The chain guide is attached to the foundation and has a guide wheel extending into the chain for pushing against the chain, so that the chain can move between a tensioned position and a relaxed position.

8 Claims, 7 Drawing Sheets

EDGE BANDING MACHINE WITH DETACHABLE ADHESIVE APPLYING MECHANISM

BACKGROUND OF THE INVENTION

1. Field of the Invention

The present invention relates to edge banding machines, and more particularly to an improved edge banding machine, which incorporates an adhesive applying mechanism that can be easily replaced.

2. Description of the Related Art

An example of the existing edge banding machine is described in Taiwan Patent No. M559851, which comprises, as shown in FIGS. 3 and 4 of the prior-art document, an adhesive applying mechanism 30 that includes an adhesive tank 32 and an adhesive shaft 31. The adhesive tank 32 contains adhesive. When heated and melted, the adhesive can be drawn by the rotating adhesive shaft 31 to the surface of the adhesive shaft 31, so that when a workpiece S passes by the adhesive shaft 31, the melted adhesive can be applied to the side surface P of the workpiece S.

The adhesive tends to deteriorate over time. Thus, after the edge banding machine 1 has been used for an extended time period, the adhesive applying mechanism 30 has to be detached from the machine for having the adhesive tank 32 cleaned. Sometimes the workpieces S to be processed is relatively light in color, and it is desirable that the adhesive used in the edge banding process is also of a light color. In such a case, the adhesive applying mechanism 30 has to be removed and replaced with adhesive of a different color. However, the adhesive shaft 31 of the adhesive applying mechanism 30 in the prior patent has a fourth gear wheel 33 that is integrated with other components through the chain 64. The adhesive applying mechanism 30 can only be detached after an interlocking pin of the chain 64 is removed using a special tool. Reassembling the adhesive applying mechanism 30 also requires the foregoing special tool. Thus, the maintenance is inconvenient.

SUMMARY OF THE INVENTION

One objective of the present invention is to provide a novel edge banding machine that addresses the shortcomings of the prior art and allows a user to attach and detach its adhesive applying mechanism easily.

To achieve this and other objectives, in one embodiment, an edge banding machine comprises a foundation, an adhesive applying mechanism, a motor, a chain guide and a chain. The adhesive applying mechanism is detachably attached to foundation and has an adhesive tank and an adhesive shaft. The adhesive shaft has an upper part extending into the adhesive tank and a lower end provided with a first sprocket. The adhesive shaft can be driven to rotate and draw adhesive contained in the adhesive tank. The motor is fixed to the foundation and has a power-take-off shaft. The power-take-off shaft has a second sprocket. The chain engages with the first sprocket and the second sprocket. The chain guide is installed on the foundation and has a guide wheel extending into the chain. Then chain guide can be driven to make the guide wheel move between a tensioned position and a relaxed position. The chain guide can be fixed in position. When the guide wheel is in the tensioned position, the guide wheel pushes against the chain so that the chain is in a tensioned state, where the motor is allowed to drive the adhesive shaft to rotate through the power-take-off shaft, the second sprocket, the chain and the first sprocket. When the guide wheel is in the relaxed position, the guide wheel leaves the chain so the chain is in a relaxed state. At this time, the motor is prevented from driving the adhesive shaft to rotate through the power-take-off shaft, the second sprocket, the chain and the first sprocket.

With the foregoing configuration of the edge banding machine, to detach the adhesive applying mechanism, a user can drive the chain guide to move the guide wheel to the relaxed position, so the chain is in the relaxed state and the user can detach the adhesive applying mechanism from the foundation easily and simply. On the contrary, to attach the adhesive applying mechanism to the foundation, a user can easily reengage the chain with the first sprocket of the adhesive shaft and the second sprocket of the power-take-off shaft and drive the chain guide to move the guide wheel to the tensioned position. At this time, the chain is in a tensioned state, where the motor is allowed again to drive the adhesive shaft to rotate through the second sprocket, the chain and the first sprocket.

In one aspect, guide wheel may rotate or linearly move, and is not limited to what is described in the disclosed embodiment.

In another aspect, the chain guide comprises a push handle. The push handle is movably attached to the foundation, and the guide wheel is provided at the end of the push handle. Optionally, the guide wheel is rotatably attached to the end of the push handle.

In one aspect, the edge banding machine further comprises an installation seat that has separated a first clamp portion and a second clamp portion. The adhesive applying mechanism is positioned between the first clamp portion and the second clamp portion. Optionally, the installation seat may further have a socket that is located between the first and second clamp portion. There is also a gap between the first clamp portion and the second clamp portion. The gap communicates the exterior of the installation seat and the socket. Each of the first clamp portion and the second clamp portion has a through hole. The edge banding machine further has a quick release installed in the two through holes for drawing the first clamp portion and the second clamp portion together, so as to allow easy attachment and detachment of the adhesive applying mechanism.

The invention as well as a preferred mode of use, further objectives and advantages thereof will be best understood by reference to the following detailed description of illustrative embodiments when read in conjunction with the accompanying drawings.

DETAILED DESCRIPTION OF THE INVENTION

In the following description and the appended claims, where a directional term such as "upper," "lower," "inner," "outer," "top," or "bottom" is used, it refers to the normally applied orientation of the subject matter, but is not intended to pose limitations to the scope of the present invention.

For further illustrating the means and functions by which the present invention achieves the certain objectives, the following description, in conjunction with the accompanying drawings and preferred embodiments, is set forth as below to illustrate the implement, structure, features and effects of the subject matter of the present invention.

Figure 1:
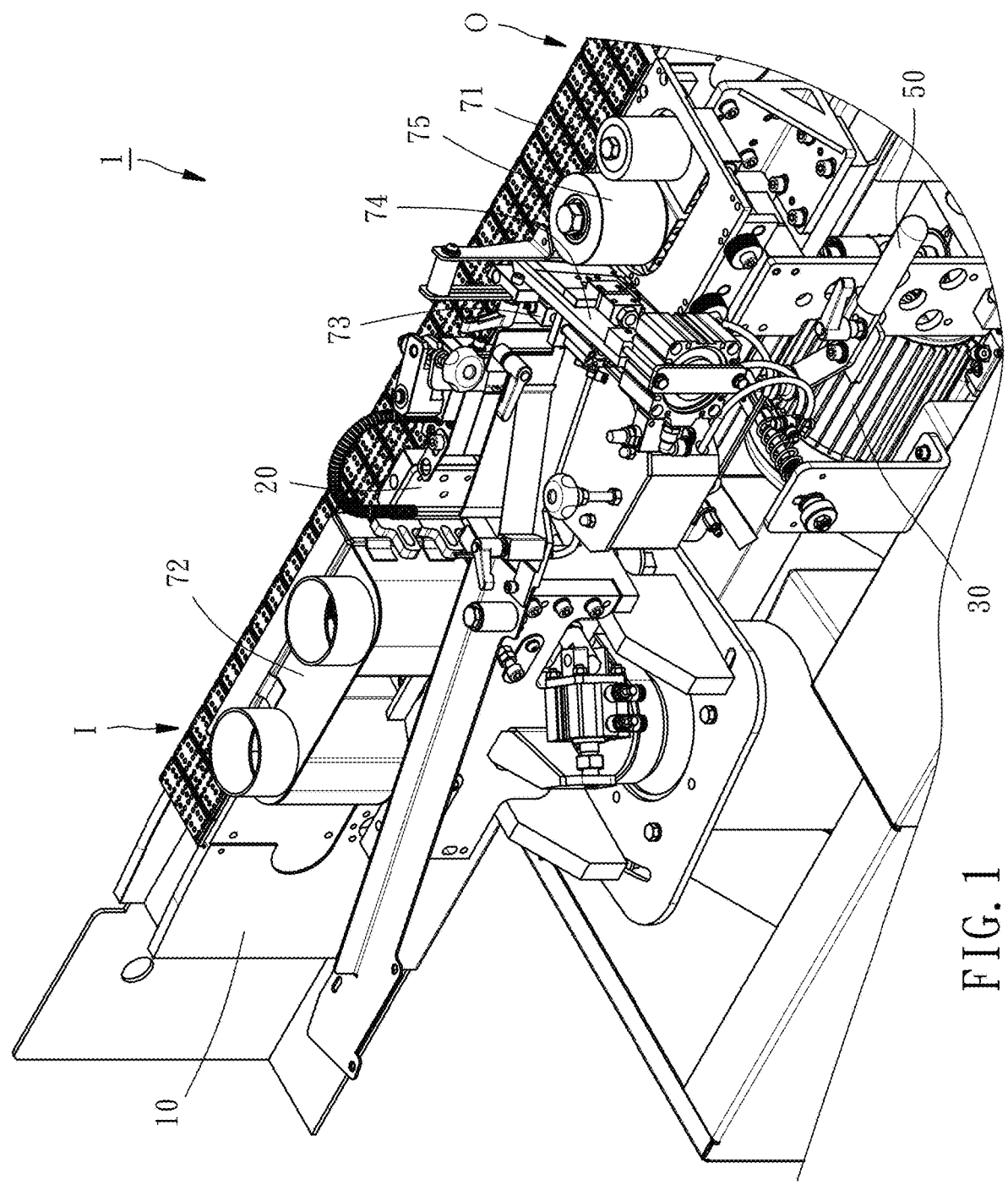
FIG. 1 is a partial perspective view of an edge banding machine according to one embodiment of the present invention.
Figure 2:
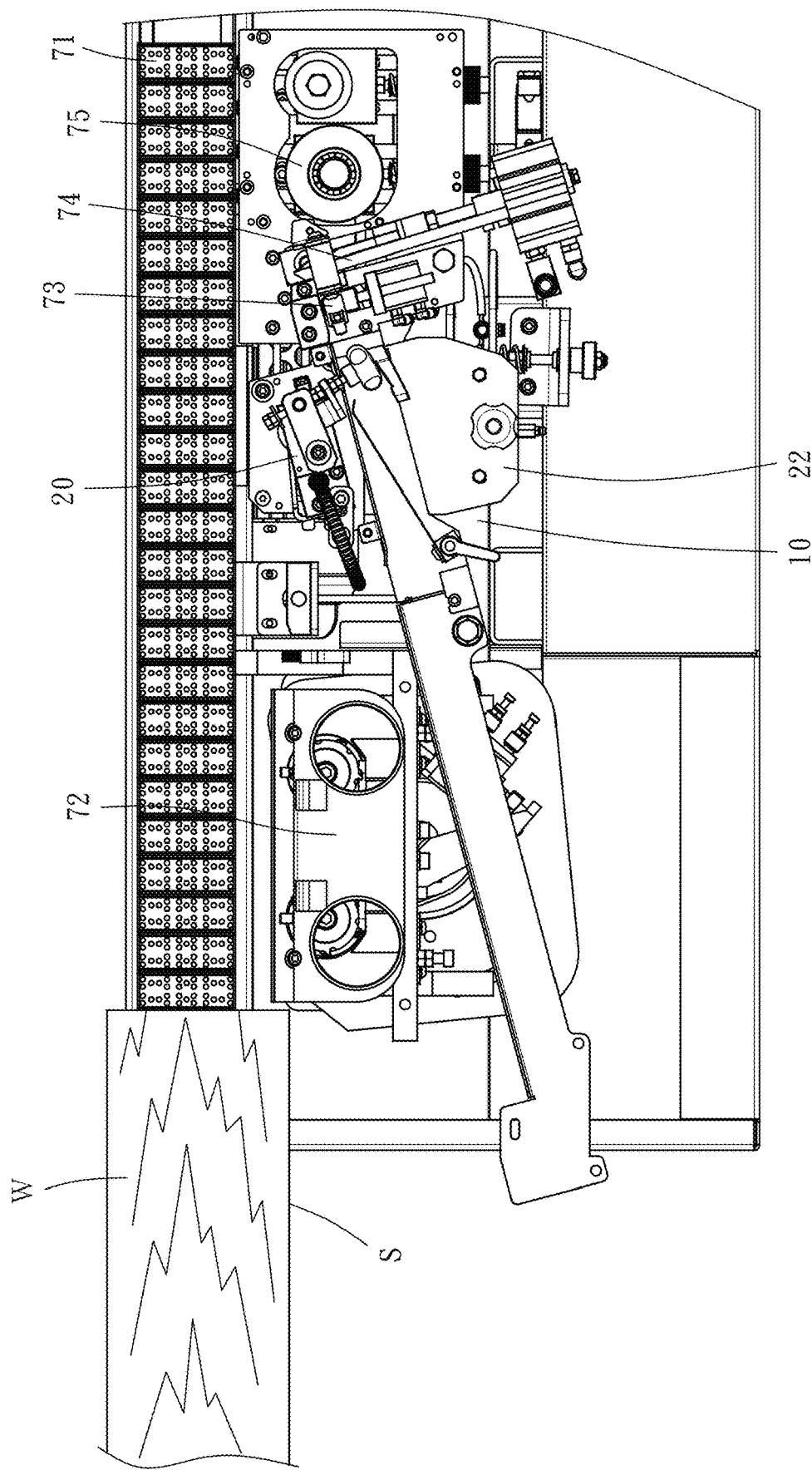
FIG. 2 is a partial top view of the edge banding machine.

As shown in FIG. 1 and FIG. 2, one embodiment of the present invention discloses an edge banding machine 1 comprising a foundation 10 and a slide guide assembly 71 mounted on the foundation 10. The slide guide assembly 71 has an input end I and an output end O. The slide guide assembly 71 is configured to convey a workpiece W to be processed. From the input end I to the output end O, there are several mechanisms installed successively mounted on the foundation 10, including a pre-milling mechanism 72, an adhesive applying mechanism 20, an edge-sheet delivering mechanism 73, a tool 74 and a pinch roller set 75. Therein, the only mechanism detachably attached to the foundation 10 is the adhesive applying mechanism 20, and all the other mechanisms are fixed installed onto the foundation 10. The pre-milling mechanism 72 is configured to trim the side surface S of the workpiece W to a predetermined wide before application of adhesive. The adhesive applying mechanism 20 is configured to apply adhesive onto the trimmed side surface S of the workpiece W, so that the workpiece W with the adhesive can have an edge sheet adhered thereto. The foundation 10 and the adhesive applying mechanism 20 will be detailed in the following paragraphs. The edge-sheet delivering mechanism 73 is configured to deliver the edge sheet. The tool 74 is configured to cut the edge sheet into a predetermined length, so that when the workpiece W with the adhesive applied pass through the pinch roller set 75, the workpiece W with the adhesive applied and the cut edge sheet can be bonded firmly.

Figure 3:
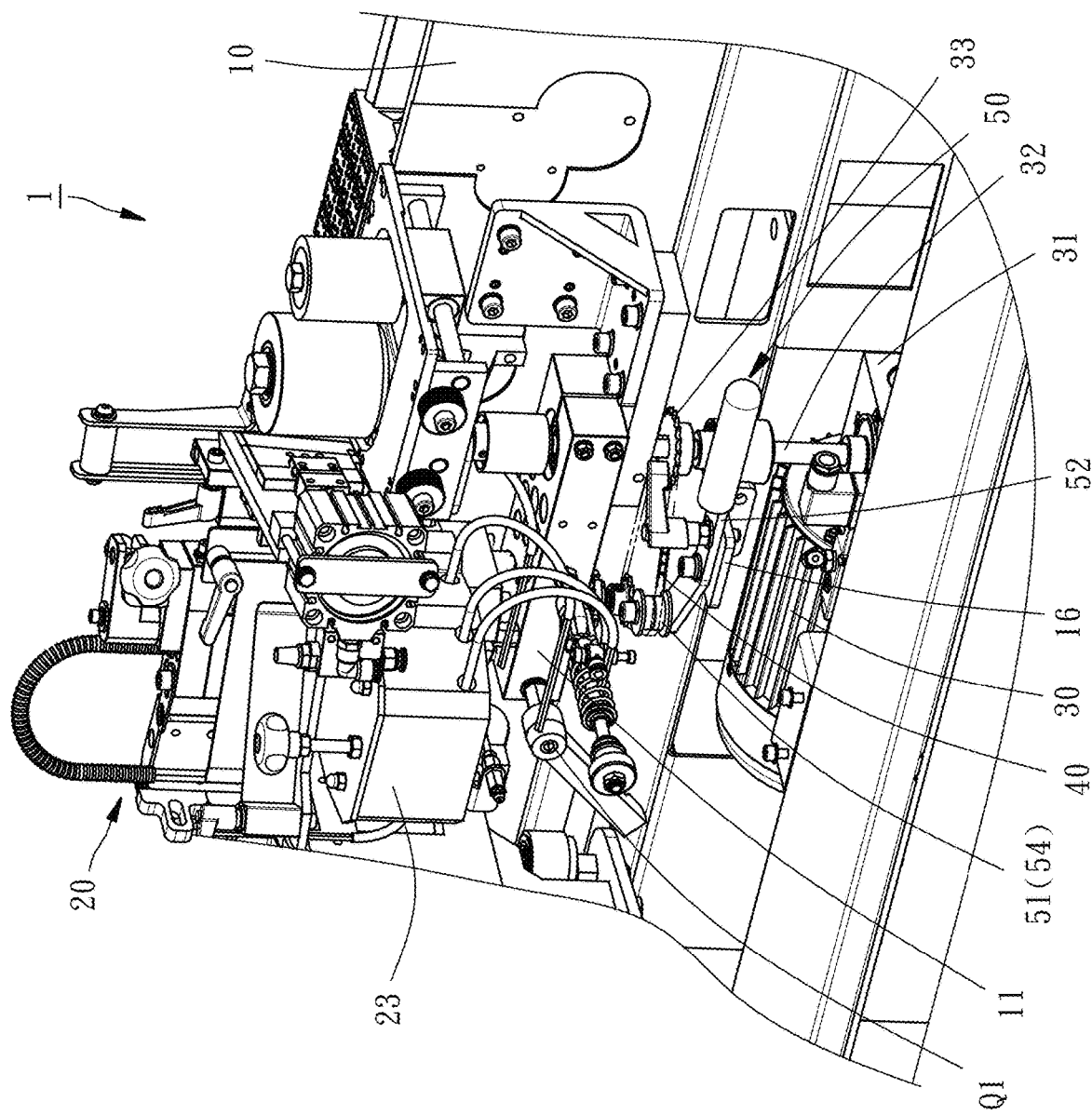
FIG. 3 is a partial, enlarged view of FIG. 1.
Figure 6:
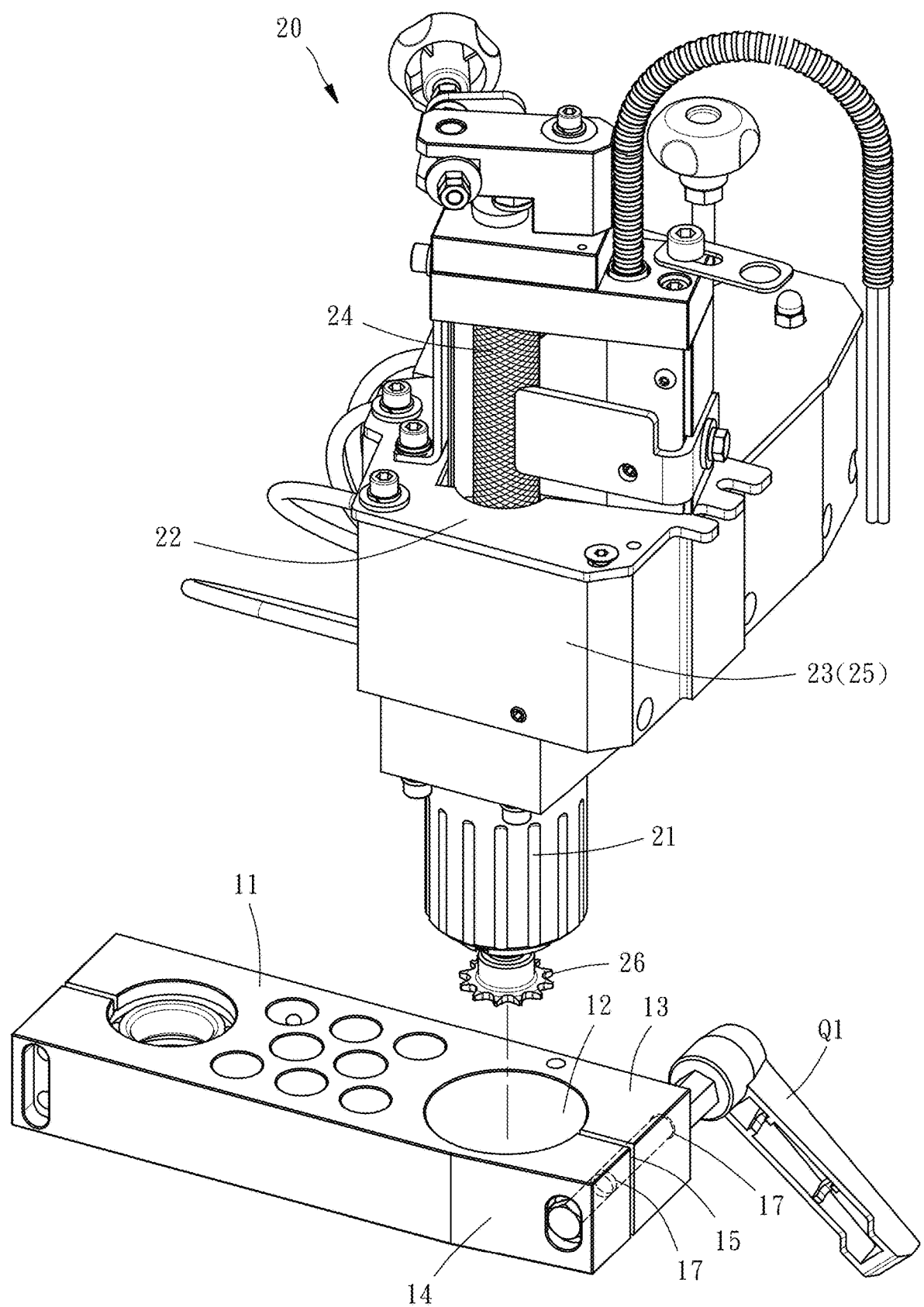
FIG. 6 is a partially exploded view depicting the adhesive applying mechanism of the edge banding machine.

Please refer to FIG. 3 and FIG. 6, the foundation 10 comprises an installation seat 11. The installation seat 11 has a socket 12 as well as a first clamp portion 13 and a second clamp portion 14 that are separated and joint surround the socket 12. The first clamp portion 13 and the second clamp portion 14 are separated by a gap 15 that communicates the exterior of the installation seat 11 and the socket 12. Each of the first clamp portion 13 and the second clamp portion 14 has a through hole 17, which is herein a threaded hole. The two through holes 17 communicate with the gap 15. A quick release Q1 passes through the through holes 17 of the first clamp portion 13 and the second clamp portion 14 to draw the first clamp portion 13 and the second clamp portion 14 together.

Figure 4:
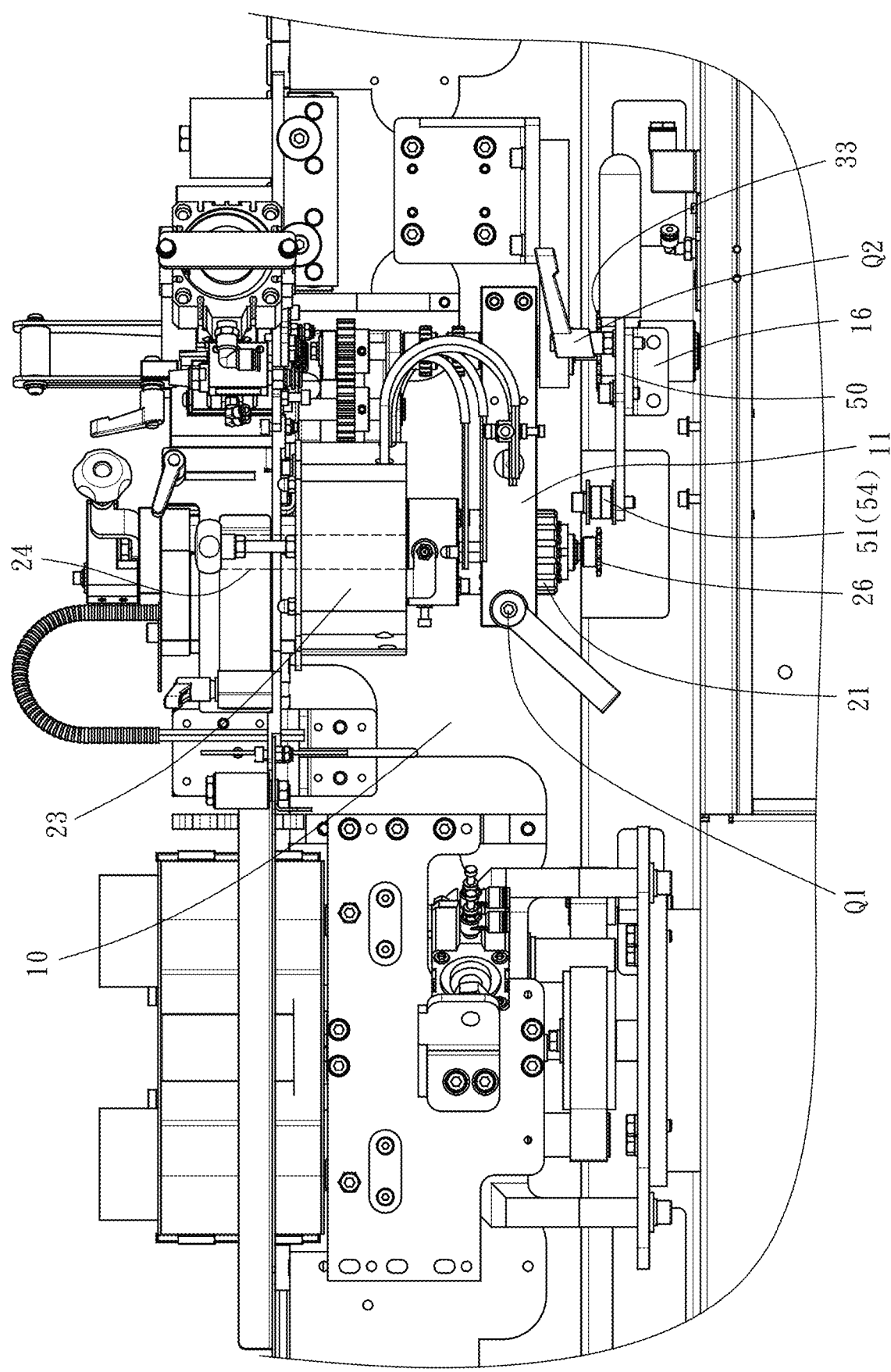
FIG. 4 is a partial, side view of FIG. 3, with the chain of the edge banding machine omitted.

Referring to FIG. 3, FIG. 4 and FIG. 6, the adhesive applying mechanism 20 is of a modularized design, which structurally comprises a lid 22, an adhesive tank 23, an adhesive shaft 24 and a heater 25. The adhesive tank 23 contains adhesive. The heater 25 heats the adhesive to a predetermined temperature where the adhesive melted and become flowable. The adhesive shaft 24 has its upper end received in the adhesive tank 23 and has its lower end provided with a first sprocket 26 (as shown in FIG. 4). The adhesive shaft 24 juts out from and partially exposed outside the lid 22. When driven to rotate, the adhesive shaft 24 draws the flowable adhesive from the adhesive tank 23, so that when the trimmed workpiece W passes by the exposed part of the adhesive shaft 24, a layer of adhesive is applied to the side surface S of the workpiece W. In addition, the adhesive applying mechanism 20 has a lower portion 21. The adhesive applying mechanism 20 is inserted into the socket 12 at its lower portion 21 so that the adhesive applying mechanism 20 is firmly positioned between the first clamp portion 13 and the second clamp portion 14, thereby detachably assembling the adhesive applying mechanism 20 to the installation seat 11.

Figure 5A:
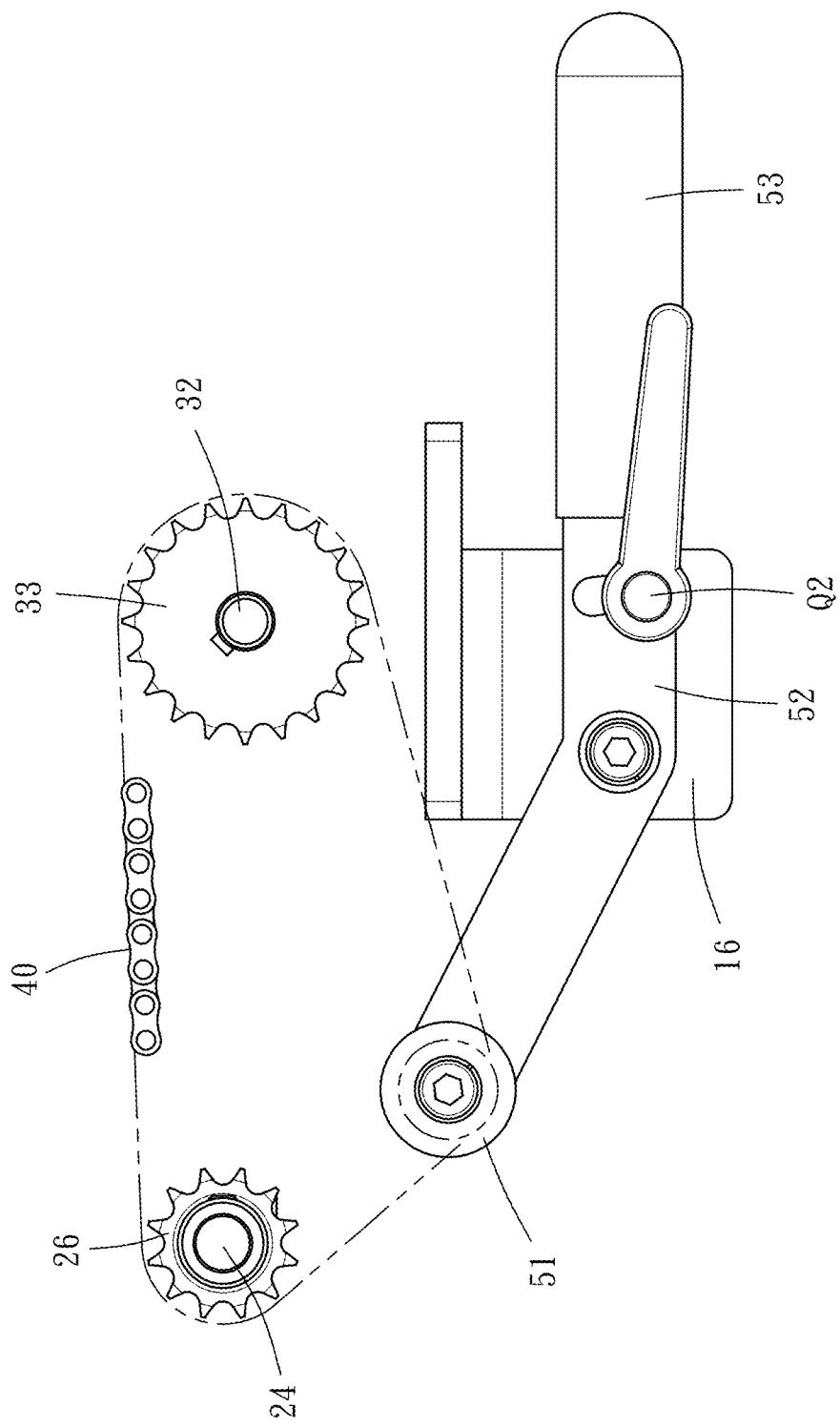
FIG. 5A and FIG. 5B are applied views of the chain guide showing the guide wheel being in the tensioned position and the relaxed position, respectively.
Figure 5B:
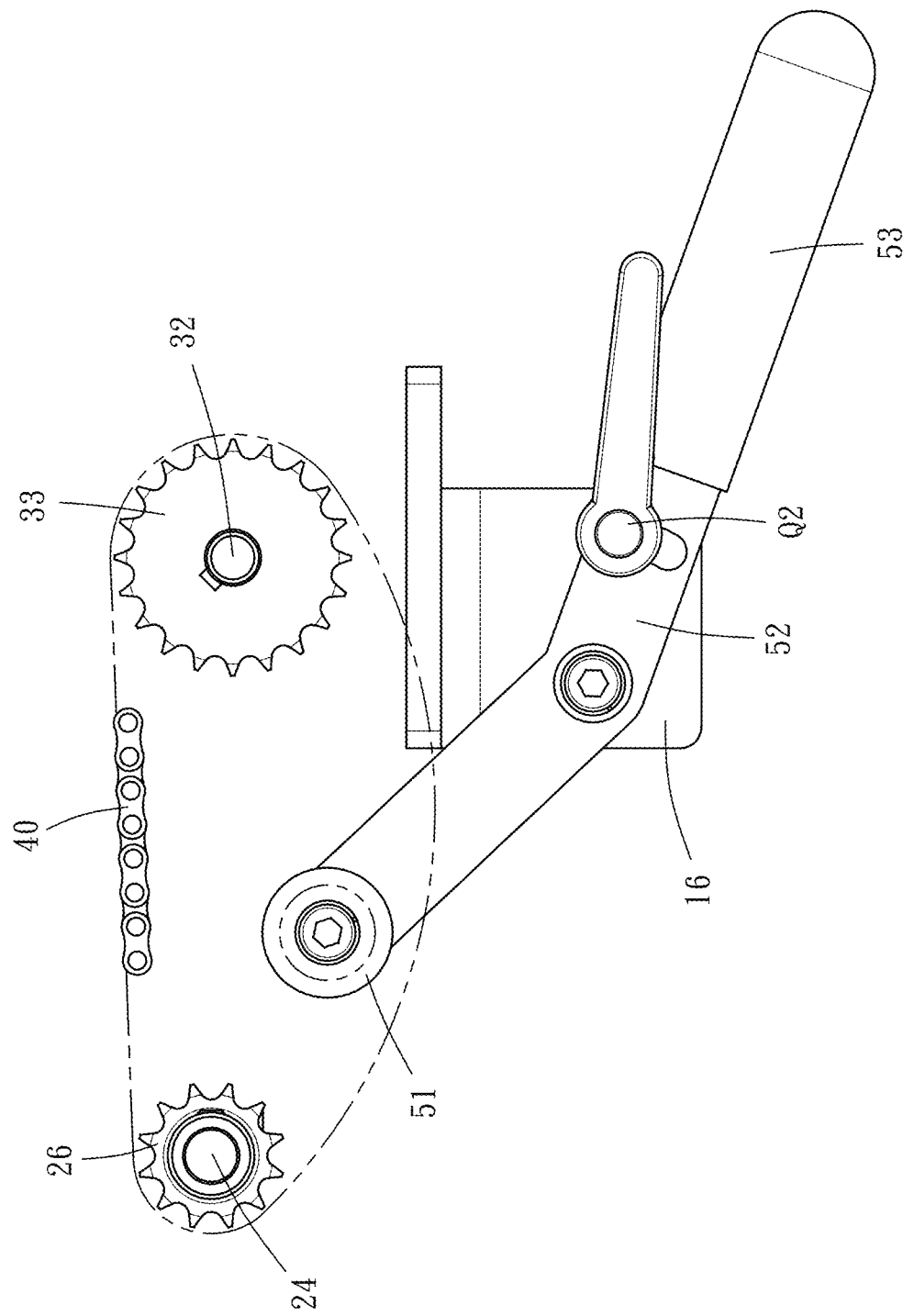

The edge banding machine 1 further comprises a motor 30, a chain 40 and a chain guide 50. Referring to FIG. 3, FIG. 5A and FIG. 5B, the motor 30 has a reduction gearbox 31 and a power-take-off shaft 32 connected to the reduction gearbox 31. When operating, the motor 30 rotates the power-take-off shaft 32 through the reduction gearbox 31. The power-take-off shaft 32 extends vertically and has it upper end provided with a second sprocket 33. The second sprocket 33 and the first sprocket 26 on the adhesive shaft 24 are at the same height.

The chain 40 engages with the first sprocket 26 and the second sprocket 33.

The chain guide 50 is fixed to the foundation 10 through a support 16 and structurally comprises a guide wheel 51, a push handle 52 and a quick release Q2 (shown in FIG. 5A and FIG. 5B). The push handle 52 is rotatably attached to the support 16, and the support 16 is fixed to the foundation 10. The push handle 52 has two opposite ends thereof provided with a gripping sleeve 53 and the guide wheel 51. The guide wheel 51 is rotatably attached to the push handle 52. The guide wheel 51 extends into the chain 40, and the guide wheel 51 has its middle section 54 shaped with an arched surface (as shown in FIG. 3 and FIG. 4), so as to smoothly push against the chain 40. The push handle 52 of the chain guide 50 is designed to be manually pushed to move between a tensioned position (as shown in FIG. 5A) and a relaxed position (as shown in FIG. 5B). The quick release Q2 passes through the push handle 52 and the support 16 to fasten the push handle 52, so that when the chain guide 50 is pushed to the tensioned position or the relaxed position, the quick release Q2 can be used to fix the push handle 52, and prevent the push handle 52 from rotate with respect to the support 16. Referring to FIG. 5A, when the guide wheel 51 is moved to the tensioned position and the push handle 52 is locked by the quick release Q2, the middle section 54 of the guide wheel 51 pushes the chain 40 away from the first sprocket 26 and the second sprocket 33, so that the chain 40 is tensioned and allows the motor 30 to drive the adhesive shaft 24 through the power-take-off shaft 32, the second sprocket 33, the chain 40 and the first sprocket 26. As shown in FIG. 5B, when the guide wheel 51 is moved to the relaxed position, the chain 40 which is not pushed by the guide wheel 51 is now relaxed, so the motor 30 is prevented from driving the adhesive shaft 24 through the power-take-off shaft 32, the second sprocket 33, the chain 40 and the first sprocket 26.

With the aforementioned configuration, a user when using the edge banding machine 1 can detach the adhesive applying mechanism 20 from the foundation 10 by pushing the push handle 52 of the chain guide 50 to move the push handle 52 to the relaxed position (as shown in FIG. 5B), thereby relaxing the chain 40. The relaxed chain 40 can be easily detached and then the quick release Q1 can be operated to stop the first and second clamp portions 13,14 from pressing the lower portion 21 of the adhesive applying mechanism 20, so the adhesive applying mechanism 20 can be detached from the foundation 10. To reattach the adhesive applying mechanism 20 to the foundation 10, a user can insert the lower portion 21 of the adhesive applying mechanism 20 into the socket 12 of the installation seat 11 again and press the adhesive applying mechanism 20 in position. Afterward, the user can engage the chain 40 with the first sprocket 26 and the second sprocket 33 again, and manually push the push handle 52 to the tensioned position (as shown in FIG. 5A). At this time, the motor 30 can again rotate the adhesive shaft 24 of the adhesive applying mechanism 20 through the second sprocket 33, the chain 40 and the first sprocket 26. Therefore, the detachment and attachment of the adhesive applying mechanism 20 is easy.

The present invention has been described with reference to the preferred embodiments and it is understood that the embodiments are not intended to limit the scope of the present invention. Moreover, as the contents disclosed herein should be readily understood and can be implemented by a person skilled in the art, all equivalent changes or modifications which do not depart from the concept of the present invention should be encompassed by the appended claims.

What is claimed is:

1. An edge banding machine with a detachable adhesive applying mechanism, comprising:
   a foundation; the adhesive applying mechanism, being detachably attached to the foundation and comprising an adhesive tank and an adhesive shaft, the adhesive shaft having an upper end extending into the adhesive tank and a lower end provided with a first sprocket, and the adhesive shaft being configured to be driven to rotate, thereby drawing adhesive contained in the adhesive tank;
   a motor, being fixed to the foundation and having a power-take-off shaft that includes a second sprocket;
   a chain, engaging with the first sprocket and the second sprocket; and
   a chain guide, being installed on the foundation and having a guide wheel extending into the chain, the chain guide being configured to be driven to make the guide wheel move between and positioned at a tensioned position and a relaxed position, so that when the guide wheel is in the tensioned position, the guide wheel pushes against and makes the chain be in a tensioned state, where the motor is allowed to drive the adhesive shaft to rotate through the power-take-off shaft, the second sprocket, the chain and the first sprocket, and when the guide wheel is in the relaxed position, the guide wheel leave the chain and the chain is in a relaxed state, where the motor is prevented from driving the adhesive shaft to rotate through the power-take-off shaft, the second sprocket, the chain and the first sprocket.

2. The edge banding machine of claim 1, wherein the chain guide comprises a push handle, which is movably attached to the foundation, and the guide wheel is provided at an end of the push handle.

3. The edge banding machine of claim 2, wherein the guide wheel is rotatably attached to the end of the push handle.

4. The edge banding machine of claim 2, wherein the push handle is movably attached to a support that is fixed to the foundation, and the edge banding machine further has a quick release that passes through the push handle and the support to fasten the push handle.

5. The edge banding machine of claim 2, further comprising an installation seat that has a first clamp portion and a second clamp portion, wherein the first clamp portion and the second clamp portion are separated and the adhesive applying mechanism is positioned between the first clamp portion and the second clamp portion.

6. The edge banding machine of claim 5, wherein the installation seat further comprising a socket that is located between the first clamp portion and the second clamp portion, and there is further a gap between the first clamp portion and the second clamp portion, the gap communicating an exterior of the installation seat and the socket, the adhesive applying mechanism further comprising a lower portion, the adhesive applying mechanism being inserted into the socket with the lower portion, the first clamp portion and the second clamp portion each having a through hole, the edge banding machine further comprising a quick release that is installed in the through hole of the first clamp portion and the through hole of the second clamp portion to draw the first clamp portion and the second clamp portion together.

7. The edge banding machine of claim 1, further comprising an installation seat that has a first clamp portion and a second clamp portion, wherein the first clamp portion and the second clamp portion are separated and the adhesive applying mechanism is positioned between the first clamp portion and the second clamp portion.

8. The edge banding machine of claim 7, wherein the installation seat further comprising a socket that is located between the first clamp portion and the second clamp portion, and there is further a gap between the first clamp portion and the second clamp portion, the gap communicating an exterior of the installation seat and the socket, the adhesive applying mechanism further comprising a lower portion, the adhesive applying mechanism being inserted into the socket with the lower portion, the first clamp portion and the second clamp portion each having a through hole, the edge banding machine further comprising a quick release that is installed in the through hole of the first clamp portion and the through hole of the second clamp portion to draw the first clamp portion and the second clamp portion together.

* * * * *